United States Patent [19]
Wamprecht et al.

[11] Patent Number: 5,969,054
[45] Date of Patent: Oct. 19, 1999

[54] HIGH SOLIDS POLYURETHANE BINDER COMPOSITIONS CONTAINING GRAFTED POLYACRYLATE POLYOLS

[75] Inventors: Christian Wamprecht, Neuss; Michael Sonntag, Odenthal; Dieter Margotte, Krefeld, all of Germany

[73] Assignee: Bayer Aktiengesellschaft, Leverkusen, Germany

[21] Appl. No.: 08/888,520

[22] Filed: Jul. 7, 1997

[30] Foreign Application Priority Data

Jul. 15, 1996 [DE] Germany .................. 196 28 444

[51] Int. Cl.⁶ .................. C08F 8/26; C08F 8/30; C08F 220/32; C08G 18/62
[52] U.S. Cl. .................. 525/392; 525/64; 525/66; 525/68; 525/123; 525/124; 525/127; 525/132; 525/154; 525/157; 525/396; 525/401; 525/403; 525/405; 525/440; 525/441; 525/442; 525/443; 525/447; 525/452; 525/454; 525/455; 525/502; 525/518; 525/523; 525/528; 525/534; 528/45; 528/75; 528/80; 528/81; 528/159; 528/246; 528/271; 528/363; 528/422
[58] Field of Search .................. 525/64, 66, 68, 525/123, 124, 127, 132, 154, 157, 392, 396, 401, 403, 405, 440, 441, 442, 443, 447, 452, 454, 455, 502, 518, 534, 523, 528; 528/45, 75, 80, 81, 159, 246, 271, 363, 422

[56] References Cited

U.S. PATENT DOCUMENTS

| | | | |
|---|---|---|---|
| 4,145,513 | 3/1979 | Dalibor | 528/75 |
| 4,758,642 | 7/1988 | Yezrielev et al. | 526/213 |
| 4,837,273 | 6/1989 | Wamprecht et al. | 525/66 |
| 4,855,369 | 8/1989 | Yezrielev et al. | 526/320 |
| 4,985,517 | 1/1991 | Yezrielev et al. | 526/208 |
| 5,034,154 | 7/1991 | Yezrielev et al. | 252/364 |
| 5,596,057 | 1/1997 | Epple et al. | 526/273 |
| 5,733,973 | 3/1998 | Wamprecht et al. | 525/68 |

FOREIGN PATENT DOCUMENTS

| | | |
|---|---|---|
| 2128551 | 1/1995 | Canada . |
| 2147723 | 11/1995 | Canada . |
| 2191934 | 6/1997 | Canada . |
| 398387 | 11/1990 | European Pat. Off. . |
| 408858 | 1/1991 | European Pat. Off. . |

*Primary Examiner*—Rabon Sergent
*Attorney, Agent, or Firm*—Joseph C. Gil; Diderico van Eyl; Thomas W. Roy

[57] ABSTRACT

The present invention relates to binder compositions containing

A) 40 to 95 parts by weight of OH-functional graft copolymer resins prepared by copolymerizing
  a) 0.1 to 10 parts by weight of polybutadienes containing at least 20% of 1,2-vinyl groups,
  b) 5 to 30 parts by weight of aliphatic α-olefins,
  c) 0.1 to 35 parts by weight of glycidyl esters of α-alkylalkane-monocarboxylic acids,
  d) 10 to 70 parts by weight of unsaturated, aromatic monomers,
  e) 5 to 60 parts by weight of hydroxyalkyl esters of acrylic and/or methacrylic acid having primary hydroxyl groups,
  f) 0 to 50 parts by weight of (cyclo)aliphatic esters of acrylic and/or methacrylic acid,
  g) 0.1 to 20 parts by weight of α,β-mono-olefinically unsaturated monocarboxylic or dicarboxylic acids and/or maleic acid or fumaric acid semi-esters and
  h) 0 to 30 parts by weight of other copolymerizable compounds and B) 5 to 60 parts by weight of polyfunctional crosslinking resins, wherein 1 to 30% by weight of the OH groups of the component A) are secondary OH groups. The present invention also relates to the use of these binder compositions for vehicle coatings, in particular automotive refinish coatings and large vehicle coatings, for wood and furniture coatings, general industrial coatings, and for coatings that provide corrosion protection.

17 Claims, No Drawings

HIGH SOLIDS POLYURETHANE BINDER COMPOSITIONS CONTAINING GRAFTED POLYACRYLATE POLYOLS

BACKGROUND OF THE INVENTION

1. Field of the Invention

The present invention relates to new, polyacrylate-based OH functional binder components, a process for their preparation, and their use to prepare coatings.

2. Description of the Prior Art

The advantage of high solids polyacrylate resins is the reduction in emissions of organic compounds, preferably solvents, during application of the lacquer. In order to obtain these high solids lacquer formulations, appropriate polyacrylate resins having low viscosities, i.e., low molecular weights, must be used.

It is known that free radical solution polymerization can be used to prepare low viscosity polymers (e.g. EP-A 408,858, EP-A 398,387, U.S. Pat. No. 4,145,513). The disadvantage in some cases is that the properties of the polymers are adversely affected by the use of considerable amounts of polymerization regulators as well as their secondary products. In particular the thiols used as polymerization regulators may have an extremely unpleasant smell or may even be poisonous. In EP-A 225,808 and EP-A 225,809 α-olefins, for example 1-octene or 1-decene, which do not have an unpleasant smell, are therefore used as regulators. However, as comparative tests have shown, two-component (2K) polyurethane (PUR) coating compositions (lacquers) based on the polyacrylate resins described in EP-A 225,809 and aliphatic lacquer polyisocyanates have too long a physical drying time for use in automotive repair lacquers (touch-up lacquers) and large vehicle lacquers.

EP-A 635,523, EP-A 638,591 and EP-A 680,977 describe high solids polyacrylate resins that are prepared by bulk polymerization and then diluted with a suitable solvent. In EP-A 635,523 an attempt was made to apply the technique—known from solution polymerization of using peroxides containing tert.-amyl groups to prepare unimodally narrowly distributed, high solids polyacrylate resins—to bulk polymerization. As expected, it was found that polyacrylate resins having a lower viscosity were obtained with peroxides containing tert.-amyl groups than with peroxides containing tert.-butyl groups. The advantages of this bulk polymerization compared to solution polymerization cannot be demonstrated unequivocally due to the lack of appropriate comparative tests. The polyacrylate resins prepared in the examples had viscosities of between 2790 and 9130 mPas at 23° C. at a solids content of 70 wt. %, which means that they are in the medium solids rather than the high solids range and, thus, do not satisfy present day requirements for high solids lacquers.

EP-A 638,591, describes high solids copolymers that have a relatively low viscosity at a high solids content by using (meth)acrylate monomers with sterically hindered (cyclo) alkyl radicals. In the preparation of these copolymers by bulk polymerization a monoepoxide (Cardura E 10 from Shell) is mentioned as reaction medium in all of the described examples. This monoepoxide reacts with the added (meth)acrylic acid during the polymerization and is thereby incorporated into the polyacrylate. Secondary hydroxyl groups are predominantly formed by this reaction, which in addition to the primary hydroxyl groups (hydroxyethyl methacrylate) or secondary hydroxyl groups (hydroxypropyl methacrylate) introduced by hydroxy-functional monomers, are available for reaction with the polyisocyanate crosslinking agent. The copolymers described in EP-A 680,977 are similar to EP-A 638,591, except that the copolymers used in EP-A 680,977 must have an acid value of at least 15 mg KOH/g.

Secondary hydroxyl groups have a significantly lower reactivity than primary hydroxyl groups with respect to polyisocyanates. 2K-PUR coating compositions based on polyacrylate resins containing more than 30% of secondary hydroxyl groups only attain a sufficient crosslinking density and consequently a satisfactory solvent resistance after several days. However, in automotive refinish lacquers and large vehicle lacquers, fast physical drying as well as a rapid chemical crosslinking are absolutely essential so that the vehicle is available for use again as soon as possible.

Accordingly, it is an object of the present invention to provide new hydroxy-functional copolymers by a simple solution polymerization process, which in combination with (cyclo)aliphatic lacquer polyiso-cyanates result in high solids coating compositions that exhibit fast physical drying and also rapid chemical crosslinking. In contrast to coatings prepared from known coating compositions, it is an object to provide high solids coating compositions that can be used to prepare high quality coatings that possess excellent solvent resistance after curing for only a few days so that coated vehicles are available for use as soon as possible.

It has now surprisingly been found that coating compositions based on binder compositions containing certain high solids graft copolymers and polyisocyanates have a very high solids content in the ready-to-use state. These lacquers may be used to prepare coatings that undergo very rapid physical drying and fast chemical crosslinking at room temperature (23° C.), i.e., they have an excellent solvent resistance after only 1 to 2 days. The extremely good overall property profile of the resulting coatings, such as hardness, elasticity, chemical resistance and weathering resistance, permits their use in vehicle lacquering, preferably in automotive refinish lacquering and large vehicle lacquering. Other applications include their use to provide corrosion protection and as wood and furniture coatings.

SUMMARY OF THE INVENTION

The present invention relates to binder compositions containing

A) 40 to 95 parts by weight, preferably 50 to 90 parts by weight, of OH-functional graft copolymer resins prepared by copolymerizing
  a) 0.1 to 10 parts by weight of optionally functional polybutadienes having a number average molecular weight of 500 to 10,000 and containing at least 20% of 1,2-vinyl groups,
  b) 5 to 30 parts by weight of aliphatic α-olefins having 8 to 16 carbon atoms,
  c) 0.1 to 35 parts by weight of glycidyl esters of α-alkylalkane- monocarboxylic acids having 4 to 30 carbon atoms in the carboxylic acid radical,
  d) 10 to 70 parts by weight of unsaturated, aromatic monomers,
  e) 5 to 60 parts by weight of hydroxyalkyl esters of acrylic and/or methacrylic acid having 2 to 4 carbon atoms in the hydroxyalkyl radical and primary hydroxyl groups,
  f) 0 to 50 parts by weight of (cyclo)aliphatic esters of acrylic and/or methacrylic acid having 1 to 12 carbon atoms in the alcohol component,
  g) 0.1, to 20 parts by weight of α,β-mono-olefinically unsaturated monocarboxylic or dicarboxylic acids having 3 to 7 carbon atoms and/or maleic acid or fumaric acid semi-esters having 1 to 14 carbon atoms in the alcohol radical and h) 0 to 30 parts by weight of other copolymerizable, olefinically unsaturated compounds and B) 5 to 60 parts by weight, preferably 10 to 50 parts by weight, of polyfunctional crosslinking resins, wherein the sum of components A) and B) is 100, based on the total weight of components A) and B), the sum of components a) to h) is 100, based on the total weight of components a) to h), and 1 to 30% by weight of the OH groups are secondary OH groups.

The present invention also relates to the use of these binder compositions for vehicle coatings, in particular automotive refinish coatings and large vehicle coatings, for wood and furniture coatings, general industrial coatings, and for coatings that provide corrosion protection.

DETAILED DESCRIPTION OF THE INVENTION

Graft copolymers A) according to the invention differ quite significantly in their chemical composition from the polyacrylate polyols of EP-A-225,809 and also from the bulk polymerization products of EP-A 635,523 and EP-A 638,591. With regard to lacquer properties, in particular drying rate and solvent resistance, the products according to the invention have advantages over the products of the prior as demonstrated in the comparison examples.

Similar, although not identical, binder compositions are described in EP-B 279,311. However, the binder compositions according to the invention are intended for a field of application that is not discussed in the European application since the lacquers described therein have too long a drying time and produce highly flexible lacquer films of insufficient hardness.

Graft copolymer resins A) can be prepared by conventional methods by copolymerizing components a) to h). Free-radical polymerization in solution is preferred, in which monomeric and oligomeric structural units are copolymerized at temperatures of 140 to 240° C. in the presence of free radical initiators.

The polyacrylate resins A) contain a) 0.1 to 10, preferably 0.3 to 7.5 and more preferably 0.5 to 5, parts by weight of optionally functional polybutadienes having a number average molecular weight of 500 to 10,000, preferably 500 to 5000 and more preferably 500 to 3000, and containing at least 20%, preferably at least 30% and more preferably at least 40%, by weight of 1,2-vinyl groups, b) 5 to 30, preferably 5 to 25 and more preferably 5 to 20, parts by weight of α-olefins having 8 to 16, preferably 8 to 12 carbon atoms, and more preferably 1-octene, 1-decene and mixtures thereof, c) 0.1 to 35, preferably 0.24 to 27 and more preferably 0.5 to 20, parts by weight of glycidyl esters c-alkylalkanemonocarboxylic acids having 4 to 30, preferably 5 to 20 and more preferably 5 to 10, carbon atoms in the carboxylic acid radical, d) 10 to 70, preferably 15 to 65 and more preferably 20 to 65, parts by weight of unsaturated, aromatic monomers, preferably styrene, α-methyl styrene or vinyl toluene and more preferably styrene, e) 5 to 60, preferably 7.5 to 55 and more preferably 10 to 50, parts by weight of hydroxyalkyl esters of acrylic and/or methacrylic acid having 2 to 4 carbon atoms in the hydroxyalkyl radical and primary hydroxyl groups, preferably hydroxyethyl acrylate, hydroxyethyl methacrylate, 1,4-butanediol monoacrylate and mixtures thereof, and more preferably hydroxyethyl acrylate, hydroxyethyl methacrylate and mixtures thereof, f) 0 to 50, preferably 0 to 45 and more preferably 0 to 35, parts by weight of cyclo)aliphatic esters of acrylic and/or methacrylic acid having 1 to 12, preferably 1 to 10, carbon atoms in the alcohol component, more preferably ethyl acrylate, butyl acrylate, 2-ethyl-hexyl acrylate, isobornyl acrylate, methyl methacrylate, ethyl methacrylate, butyl methacrylate, 2-ethylhexyl methacrylate, cyclohexyl methacrylate, isobornyl methacrylate and mixtures thereof,;

g) 0.1 to 20, preferably 0.4 to 16.5 and more preferably 0.7 to 11.2, parts by weight of α,β-mono-olefinically unsaturated mono-carboxylic or dicarboxylic acids having 3 to 7 carbon atoms and/or maleic acid or fumaric acid semi-esters having 1 to 14 carbon atoms in the alcohol radical, preferably acrylic acid, methacrylic acid, maleic acid semi-esters or fumaric acid semi-esters having 1 to 8 carbon atoms in the alcohol component, and mixtures thereof, and more preferably acrylic acid, methacrylic acid and mixtures thereof, h) 0 to 30, preferably 1 to 25 and more preferably 3 to 20, parts by weight of other copolymerizable, olefinically unsaturated compounds, preferably acrylonitrile, methacrylonitrile, hydroxy-propyl (meth)acrylate (up to 10 parts by weight), vinyl esters of aliphatic, optionally branched mono-carboxylic acids having 1 to 10 carbon atoms in the acid radical, di(cyclo)alkyl esters of maleic and/or fumaric acid having 1 to 8 carbon atoms in the alcohol component and mixtures thereof, and more preferably vinyl esters of aliphatic, optionally branched monocarboxylic acids having 3 to 9 carbon atoms in the acid radical, di(cyclo)alkyl esters of maleic and/or fumaric acid having 1 to 8 carbon atoms in the alcohol radical and mixtures thereof, wherein the sum of the parts by weight of components a) to h) is 100, based on the weight of components a) to h), preferably the sum of the parts by weight of components a) to h) is 100, and 1 to 30%, preferably 2 to 25% and more preferably 3 to 20%, by weight of the OH groups are secondary OH groups.

In principle all polybutadienes having at least 20% of side-chain 1,2-vinyl double bonds are suitable as starting materials a) for graft copolymers A). Polybutadienes having a vinyl double bond content of at least 30% are preferred. The remaining double bonds are those having either a 1,4-cis and 1,4-trans structure. Polybutadienes which additionally have double bonds in ring structures are also suitable as component a). A particularly suitable starting material is a product having at least 40% of 1,2-vinyl double bonds.

Preferably, isomeric mixtures of polybutadienes are used, e.g., polybutadienes having 30 to 90% of 1,2-vinyl double bonds, 10 to 70% of mixtures of 1,4-cis and 1,4-trans double bonds, and 0 to 30% of cyclic fractions. The polybutadienes may additionally contain functional groups, e.g., hydroxyl groups or carboxyl groups. Polybutadienes having different configurations are known and described, for example, in "Makromoleküle" (Macromolecules) by H. G. Elias, 4th Edition, Hüthig und Wepf-Verlag, Basel, Heidelberg, New York, pp. 676 as well as 744 to 746 and 1012 ff.

Suitable starting components c) for preparing graft copolymers A) include glycidyl esters of 2,2-dimethylpropionic acid, 2-ethylhexanoic acid and neoacids, such as neodecanoic (C10) acid or neononanoic (C9) acid. The alkyl radicals in these neo acids may have different numbers of carbon atoms. Particularly preferred is the glycidyl ester of versatic acid (10 carbon atoms in the acid radical, e.g., Cardura E 10 from Shell).

The monomers and/or oligomers a) to h) are generally incorporated into the graft copolymer in the same ratios as they are used for the polymerization. The incorporated units are randomly distributed. Component b) may be substantially located at the end of a polymer chain where it acts as a chain terminator, and also may not be fully incorporated into the graft copolymer. Component b) is then present partly as residual monomer in the dissolved graft copolymer and remains either in the product as a solvent or can be removed by distillation together with other solvents and volatile constituents.

Suitable solvents for the preparation of component A) include aliphatic, cyclo-aliphatic and/or aromatic hydrocarbons. Examples include alkyl benzenes such as toluene and xylene; esters such as ethyl acetate, n-propyl acetate, isopropyl acetate, n-butyl acetate, acetates with relatively long alcohol residues, butyl propionate, pentyl propionate, ethylene glycol monoethyl ether acetate and ethylene glycol monomethyl ether acetate; ethers such as ethylene glycol acetate monomethyl, ethyl and butyl ether; ketones such as methyl amyl ketone and methyl isobutyl ketone; glycols; alcohols; lactones; and mixtures thereof.

The preparation of graft copolymers A) may be carried out continuously or batch- wise. Normally the monomer mixture and the initiator are uniformly and continuously metered into the polymerization reactor, while the corresponding amount of polymer is continuously removed at the same time. Copolymers that are uniform and homogeneous from a chemical standpoint are prepared in this way. Uniform and homogeneous copolymers can also be prepared by metering the monomer mixture and the initiator at a constant rate into the polymerization reactor without removing the polymer.

The graft copolymerization takes place at a temperature of 140° to 240° C., preferably 160° to 210° C., under a pressure of up to 25 bar. The initiators are added in amounts of 0.05 to 15 wt. %, preferably 1 to 10 wt. %, based on the total weight of components a) to h).

Suitable initiators for preparing graft copolymers A) are known and include azo-based or peroxide-based radical initiators, provided that they have a sufficiently long half-life of about 5 seconds to about 30 minutes for the polymerization. Suitable initiators include 2,2'-azobis-(2-methyl-propane-nitrile), 2,2'-azobis-(2-methylbutanenitrile), 1,1'-azobis-(cyclo-hexanecarbonitrile), tert.-butylperoxy-2-ethylhexanoate, tert.-butyl-peroxydiethylacetate, tert.-butylperoxyisobutyrate, 1,1 -di-tert.-butylperoxy-3,3,5-trimethyl-cyclohexane, 1,1 -di-tert.-butylperoxy-cyclohexane, tert.-butylperoxy-3,5,5-trimethylhexanoate, tert.-butylperoxyisopropyl-carbonate, tert.-butyl-peroxyacetate, tert.-butylperoxybenzoate, dicumylperoxide, tert.-butylcumyl peroxide, di-tert.-butyl peroxide and di-tert.amyl peroxide.

Graft copolymers A) are valuable binder components for high solids one-component and two-component coating compositions in combination with a crosslinking agent. In addition to the polymer resins according to the invention, the binders also contain a hardener component and optionally other polyhydroxyl compounds and/or amine-functional reactive thinners. If the hardener is, e.g., a polyisocyanate having free isocyanate groups, the two-component coating composition is prepared shortly before use by mixing the components. However, if the hardener is a compound that reacts with the polymer resins only at elevated temperatures, e.g., a polyisocyanate with blocked isocyanate groups, the hardener can be mixed at room temperature with the polymer resin to form a one-component coating composition that can be stored at room temperature.

The graft copolymers according to the invention may optionally be mixed with other organic polyhydroxyl compounds known from polyurethane lacquer technology and/or with amine-functional reactive thinners. These other polyhydroxyl compounds include polyester, polyether, polycarbonate, polyurethane or polyacrylate polyols, preferably polyacrylate polyols and/or polyester polyols, if such compounds are used at all. The amine-type reactive thinners include products with blocked amino groups, for example aldimines or ketimines, or products that contain free amino groups having decreased reactivity such as aspartic acid esters. Preferably, the amine-functional reactive thinners contain more than 1 (blocked) amino group such that they contribute to the crosslinking reaction to build up the polymer film network.

The graft copolymers according to the invention may be mixed with up to 70 wt. %, preferably up to 50 wt. %, of these other polyols and/or amine-functional reactive thinners. However, it is preferred to use the graft copolymers according to the invention as the sole polyol component.

The hydroxyl group content of graft copolymers A) is 0.53 to 8.76 wt. %, preferably 0.88 to 8.03 wt. % and more preferably 1.31 to 7.3 wt. %.

Suitable crosslinking resins B) are those that chemically react with the hydroxyl groups of graft copolymers A) and result in a hardening (curing) of the coatings according to the invention. Examples include amino resins, e.g., melamine derivatives such as alkoxylated melamine resins or melamine-formaldehyde condensation products (e.g. FR-PS 943,411, D. H. Salomon in "The Chemistry of Organic Filmformers", pp. 235–240, John Wiley & Sons, Inc., New York, 1974); and other known crosslinking agents such as reactive epoxides, carboxylic acid anhydrides, phenolic resins, resol resins, urea resins or guanidine resins and mixtures thereof.

The preferred crosslinking component B) for graft copolymers A) are the known optionally blocked, lacquer polyisocyanates, in particular the known derivatives of monomeric diisocyanates containing urethane groups, uretdione groups, allophanate groups and especially biuret groups and/or isocyanurate groups. Suitable monomeric diisocyanates include 1,6-diisocyanatohexane, 1-isocyanato-3-isocyanatomethyl-3,5,5-trimethylcyclohexane (isophorone diisocya-nate), 1-methyl-2,4-diiso-cyanatocyclohexane and mixtures thereof with up to 35 wt. %, based on the weight of the mixture, of 1-methyl-2,6-diisocyanato-cyclohexane; 2,4-diisocyanatotoluene and mixtures thereof with up to 35 wt. %, based on the weight of the mixture, of 2,6-diisocyanatotoluene; and mixtures of the preceding diisocyanates. Particularly preferred are the lacquer, polyisocyanates having aliphatically and/or cycloaliphatically bound, free isocyanate groups.

Suitable blocking agents for preparing the optional blocked polyisocyanates include $\epsilon$-caprolactam, butanone oxime, phenol or phenol derivatives, secondary amines and alkyl esters of malonic acid.

The lacquer polyisocyanates containing urethane groups include the reaction products of 2,4- and optionally 2,6-diisocyanatotoluene or 1-methyl-2,4- and optionally 1-methyl-2,6-diisocanatocyclohexane with less than stoichiometric amounts of trimethylolpropane or mixtures thereof with diols such as the isomeric propanediols or butanediols. The preparation of these lacquer polyisocyanates containing urethane groups in essentially monomer free form is described for example in DE-A 1,090,196.

The lacquer polyisocyanates containing biuret groups, which are especially preferred in the use according to the invention, include in particular those polyisocyanates based on 1,6-diisocyanatohexane, which may be prepared as described for example in EP-A 0,003,505, DE-A 1,101,394, U.S. Pat. No. 3,358,010 or U.S. Pat. No. 3,903,127.

The lacquer polyisocyanates containing isocyanurate groups, which are also preferred, include in particular trimers or mixed trimers prepared from the previously described diisocyanates. Examples include the diisocyanatotoluene-based polyisocyanates containing isocyanurate groups according to GB-A 1,060,430, 1,506,373 and 1,485,564; the mixed trimers of diisocyanatotoluene with 1,6-diisocyanatohexane described in DE-A 1,644,809 and 3,144,672; and in particular the aliphatic or aliphatic-cycloaliphatic trimers or mixed trimers based on 1,6-diisocyanatohexane and/or isophorone diisocyanate, which are described in U.S. Pat. No. 4,324,879, U.S. Pat. No. 4,288,586, DE-A 3,100,262, 3,100,263, 3,033,860 and 3,144,672.

The lacquer polyisocyanates have an isocyanate content of 5 to 25 wt. %, an average NCO functionality of 2.0 to 5.0, preferably 2.8 to 4.0, and a residual content of monomeric diisocyanates of less than 2 wt. %, preferably less than 0.5 wt. %. Mixtures of the preceding lacquer polyisocyanates may also be used.

In the high solids polyurethane coating compositions the polyol,component and the polyisocyanate component are present in amounts corresponding to an equivalent ratio of isocyanate groups to hydroxyl groups of 5:1 to 1:2, preferably 1.5:1 to 1:1.2. The two-component binders obtained by mixing the two components have only a limited application time or pot life of about 4 to 24 hours and are applied either as solvent-free clear lacquers or mixed with known additives. These optional additives may be added either to the mixture or to the individual components before they are mixed.

Suitable additives include solvents such as ethyl acetate, n-propyl acetate, isopropyl acetate, n-butyl acetate, n-hexyl acetate, n-heptyl acetate, 2-ethylhexyl acetate, methoxypropyl acetate, methyl ethyl ketone, methyl isobutyl ketone, toluene, xylene, higher aromatic mixtures, white spirit, and mixtures of these solvents.

Other suitable additives include plasticizers such as tricresyl phosphate, phthalic acid diesters and chlorinated paraffins; pigments and fillers such as titanium dioxide, barium sulphate, chalk and carbon black; catalysts such as N,N-dimethylbenzylamine, N-methylmorpholine, zinc octoate, tin-II-octoate and dibutyl tin dilaurate; flow agents; thickeners; stabilizers such as substituted phenols; coupling agents such as organofunctional silanes; light stabilizers; and UV-absorbers.

Suitable light stabilizers include the sterically hindered amines described, for example, in DE-A 2,417,353 (U.S. Pat. No. 4,123,418 and U.S. Pat. No. 4,110,304) and DE-A 2,456,864 (U.S. Pat. No. 3,993,655 and U.S. Pat. No. 4,221,701). Particularly preferred compounds include bis-(1,2,2,6,6-pentamethyl-piperidyl-4)-sebacate, bis-(2,2,6,6-tetra-methylpiperidyl-4)-sebacate, n-butyl-(3,5-di-tert.-butyl-4-hydroxybenzyl)-malonic acid bis-(1,2,2,6,6-pentamethylpiperidyl-4)-ester.

The moisture present in the fillers and pigments can be removed by prior drying or by using water-absorbing substances such as molecular sieve zeolites.

Coatings can be obtained from the coating compositions according to the invention at room temperature when using polyisocyanates containing free isocyanate groups. Elevated temperatures are not necessary to achieve optimum properties. However, when the binders are used to prepare refinish coatings, it is often recommended to increase the temperature to about 60 to 100° C., preferably 60 to 80° C., for 20 to 60 minutes to reduce the drying time and curing time.

When blocked polyisocyanates or the other previously mentioned crosslinking agents are used, higher temperatures of 100° to 240° C., preferably 120° to 220° C., must be used for drying and hardening the coatings.

The coatings obtained according to the invention are characterized by high hardness, good elasticity, excellent weathering and chemical resistance, as well as high gloss. The curing times for both physical drying and chemical crosslinking are very short, with the result that the coated articles are quickly rendered resistant to solvents and chemicals.

The coating compositions according to the invention are suitable for coating large objects and vehicles, such as aircraft, railway cars, lorries, tankers, trailers, etc. Another preferred area of application is for automotive refinish coatings. The coating compositions are also suitable for corrosion protection applications, e.g., for coating bridges and power pylons; for coating wood and furniture; for general industrial coatings; and for initial automotive (OEM) coatings.

The coating compositions according to the invention may be applied by known methods, such as spraying, pouring, dipping, coating or rolling. The coating compositions according to the invention are suitable for preparing primer coats, intermediate coats and especially top coats.

EXAMPLES

Unless otherwise specified, all parts and percentages are by weight.

1. General preparation procedure for graft copolymers A1 to A6 and comparison product V1

Part I of the formulation was placed in a 5 liter capacity stainless steel pressurized reactor equipped with stirrer, distillation device, storage containers for the monomer mixture and initiator, including metering pumps as well as an automatic temperature regulation device, and was heated to 195° C. Part II (monomer mixture) and part III (initiator) were then metered in starting at the same time through separate feed inlets, within 1.5 hours and 1.75 hours respectively, while the polymerization temperature was maintained almost constant (±2° C.). The batch was then stirred for 30 minutes at the polymerization temperature. The mixture was then cooled to room temperature and the solids content was measured. The graft copolymers had a solids content of 75±1%. Some of the α-olefin used was not incorporated into the polymer. If the solids content was ≦73%, the mixture was post-activated for 30 minutes at 150° C. with 5% of the original amount of initiator. If the solids content was between 73% and 74%, the mixture was distilled to 75±1%. The graft copolymer was then filtered through a filter (Seitz Supra 5500). The compositions of parts I to III as well as the properties of the resulting products are set forth in Table I.

2. Formulation and adjustment of copolymer 2 of EP-A 638,591 as comparison example V2

Copolymer 2 of EP-A 638,591 (U.S. Pat. No. 5,596,057) was formulated and adjusted exactly according to the preparation instructions and composition. A product having the following properties was obtained:

| | |
|---|---|
| Solids content: | 74.2% |
| Viscosity at 23° C.: | 8450 mPa · s |
| Acid number, solution/solids: | 7.5/10.1 |
| Hydroxyl number, solution/solids: | 109/147 |
| Hazen Color units: | 65 APHA |
| Appearance: | Clear |

TABLE 1

Composition and properties of graft copolymers A1 to A6 and comparison product V1

| Copolymer | A1 | A2 | A3 | A4 | A5 | A6 | V1 |
|---|---|---|---|---|---|---|---|
| Composition | | | | | | | |
| Part 1 | | | | | | | |
| Butyl acetate | 15.00 | 15.00 | 15.00 | 15.00 | 15.00 | 15.00 | 15.00 |
| 1-decene | 8.00 | 8.00 | 8.70 | 8.91 | 8.00 | 8.51 | 9.40 |
| Vinyl ester VeoVa 9[1] | 6.48 | 6.48 | 6.40 | 5.67 | 5.00 | 4.86 | — |
| Cardura E 10[2] resin | 11.91 | 9.53 | 6.53 | 4.05 | 6.53 | 4.05 | — |
| Part 2 | | | | | | | |
| Styrene | 27.06 | 28.89 | 30.37 | 31.69 | 32.47 | 33.71 | 33.00 |
| Hydroxyethyl methacrylate | 18.61 | 19.85 | 21.09 | 22.32 | 21.09 | 22.32 | 23.00 |
| Butyl acrylate | — | — | — | — | — | — | 9.20 |
| Polybutadiene Lithene AL[3] | 0.81 | 0.81 | 0.81 | 0.81 | 0.81 | 0.81 | — |
| Acrylic acid | 4.89 | 4.20 | 3.45 | 2.69 | 3.45 | 2.69 | 1.40 |
| Part 3 | | | | | | | |
| Di-tert-butyl peroxide | 3.24 | 3.24 | 3.65 | 4.86 | 3.65 | 4.05 | 5.00 |
| Butyl acetate | 4.00 | 4.00 | 4.00 | 4.00 | 4.00 | 4.00 | 4.00 |
| Properties | | | | | | | |
| Solids content % | 75.1 | 75.3 | 75.9 | 74.3 | 76.0 | 76.0 | 74.6 |
| Viscosity at 23° C., mPa·s | 5125 | 6171 | 5543 | 5020 | 6694 | 6778 | 4500 |
| Acid number, mg KOH/g solution | 12.6 | 12.4 | 12.7 | 13.7 | 13.1 | 13.0 | 13.4 |
| OH number, mg KOH/g solution | 106 | 106 | 100 | 103 | 103 | 101 | 98 |
| OH content, based on solids | 4.2 | 4.2 | 4.0 | 4.2 | 4.1 | 4.0 | 4.0 |
| Color unit, APHA | 60 | 50 | 55 | 45 | 20 | 45 | 10 |
| Appearance | clear | clear | clear | clear | clear | clear | clear |

[1] and [2]: Commercial products from Shell
[3] Commercial product from Chemetall, Frankfurt, polybutadiene with 40–50% 1,2-vinyl groups, 15–25% 1,4 trans vinyl group, 10–20% 1,4 cis vinyl groups and 15–20% vinyl groups in cyclic structures, number average molecular weight: 1000.
[2] Cardura E10: Glycidyl ester of a $C_{10}$-mono carboxylic acid with an epoxy equivalent weight of 247–253.
[1] VeoVa 9: Vinyl ester of a $C_9$-mono carboxylic acid.

3. Example of use - Preparation of coating compositions based on the polyacrylate polyols A1 to A6 and V1 and V2

To evaluate the general coating properties, clear coating compositions were prepared. For this purpose a lacquer polyisocyanate was added to polyols A1 to A6, V1 and V2, at an NCO/OH equivalent ratio of about 1:1. The lacquer polyisocyanate was an isocyanurate group-containing polyisocyanate prepared from 1,6-diisocyanatohexane; present as a 90% solution in a 1:1 mixture of butyl acetate and solvent naphtha 100 solvent; and NCO content of about 19.4 wt. %, based on solution; content of unreacted 1,6-diisocyanatohexane <0.5%, based on solution. The following amounts of additives were used, based on solids, i.e., total solids polyol and polyisocyanate.

| Constituents | Wt. %, solid/solid |
|---|---|
| Dabco 33 LV (polyurethane catalyst from Air Products, 10% in butyl acetate) | 0.3 |
| BYK 331 (flow agent from BYK-Chemie, 50% in butyl acetate) | 0.3 |
| Tinuvin 1130 (UV absorber from Ciba Geigy, 50% in xylene) | 2.0 |

-continued

| Constituents | Wt. %, solid/solid |
|---|---|
| Tinuvin 292 (light stabilizer from Ciba Geigy, Basel, 50% in xylene) | 1.0 |

A 1:1:1 mixture of methoxy propyl acetate, xylene and n-butyl acetate was used as solvent. The coating composition was formulated to provide contents of:
about 56 wt. % binders,
about 2 wt. % additives,
about 42 wt. % solvents.

The flow time (DIN 53 211, 4 mm nozzle) was about 20 sec. The coating compositions were adjusted to be sprayable and had a VOC (volatile organic compounds) content of 3.5 lbs/gal.

The coating compositions were coated onto glass plates and dried at room temperature and then for 30 minutes at 60° C. The drying rate was measured according to DIN 53 150 and then the plates were stored for 7 days at room temperature. The dry film thickness was about 40 to 50 µm.

The hardness was measured according to König (DIN 53 157), the gloss according to Gardner at a 60° angle (DIN 67 530), and the solvent resistance was tested with super grade gasoline after storage for 1, 2, 3 and 4 days at room temperature. The Erichsen indentation was measured on suitably coated test sheets.

The resistance to, yellowing was also tested by irradiation with short-wave UV light in the QUV test (QUV Accelerated Weathering Tester, ASTM G 53-77). For this purpose clear coating compositions based on the polyols A1 to A6 and V1 and V2 were applied to aluminum sheets (68 mm×150 mm) that had previously been primed and coated with a white undercoat. After application and drying of the coating compositions for 30 minutes at 60° C., the sheets were stored for 7 days at room temperature and then tested in the QUV tester (Q-Panel Company). The aluminum sheets were then subjected to a test cycle consisting of irradiation for 4 hours in intense, unfiltered UV light having a wavelength of about 280 to 370 nm (maximum at 313 nm) followed by 4 hours in the dark, for a total cycle of 1000 hours. After washing the sample the overall color difference ΔE was measured with a calorimeter (compared to the unweathered plate) to provide an indication of the yellowing that had occurred.

The test results of coating compositions based on the copolymers A1 to A6 and V1 and V2 are set forth in Table 2.

gasoline. Although the coating produced from comparison polyol V2 dried rapidly, it had poor resistance to super grade gasoline after 1 day, and although the resistance improved after 2 to 3 days, it only became satisfactory after 4 days.

Therefore, the test results clearly demonstrate that high solids 2K-PUR clear coating compositions based on polyols A1 to A6 according to the invention exhibit a very fast drying time and very good resistance to gasoline, despite their high solids content, which means that objects and articles, such as vehicles and vehicle parts coated with these coating compositions, can be used for their intended purpose after an extremely short time.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A binder composition comprising
    A) 40 to 95 parts by weight of OH-functional graft copolymer resin prepared by copolymerizing
        a) 0.1 to 10 parts by weight of an optionally functional polybutadiene having a number average molecular weight of 500 to 10,000 and containing at least 20% of 1,2-vinyl groups,
        b) 5 to 30 parts by weight of an aliphatic α-olefin having 8 to 16 carbon atoms,
        c) 0.1 to 35 parts by weight of a glycidyl ester of an α-alkylalkanemonocarboxylic acid having 4 to 30 carbon atoms in the carboxylic acid radical,
        d) 10 to 70 parts by weight of an unsaturated, aromatic monomer,

TABLE 2

Test results of 2K-PUR clear coating compositions based on polyols A1 to A6 according to the invention and comparison polyols V1 and V2

| Coating composition based on polyol | A1 | A2 | A3 | A4 | A5 | A6 | V1 | V2 |
|---|---|---|---|---|---|---|---|---|
| Drying[1] at room tmp | | | | | | | | |
| T1 (minutes) | 105 | 90 | 120 | 75 | 120 | 75 | 150 | 120 |
| T3 (hours) | 7.0 | 6.5 | 7.5 | 6.0 | 7.5 | 6.0 | 9.0 | 7.5 |
| Pendulum damping[2] | | | | | | | | |
| 23° C. + 1 d RT, 1 min/5 min | 1/1 | 0/1 | 1/1 | 0/1 | 1/1 | 0/1 | 1/2 | 2/4 |
| 23° C. + 2 d RT, 1 min/5 min | 0/0 | 0/0 | 0/1 | 0/0 | 0/1 | 0/0 | 0/1 | 1/2 |
| 23° C. + 3 d RT, 1 min/5 min | — | — | 0/0 | — | 0/0 | — | 0/0 | 0/1 |
| 23° C. + 4 d RT, 1 min/5 min | — | — | — | — | — | — | — | 0/0 |
| Erichsen indentation (mm) | 11.0 | 10.5 | 10.5 | 11.0 | 11.0 | 10.5 | 11.0 | 10.5 |
| QUV test (ΔE) 500 h/1000 h | 4.1/6.0 | 4.2/6.1 | 4.4/6.7 | 4.6/6.8 | 4.9/7.1 | 5.0/7.3 | 4.4/6.8 | 4.1/6.3 |
| Gloss[3] (60°) 0 hrs./1000 hrs. | 95/92 | 96/93 | 97/92 | 97/95 | 98/97 | 97/95 | 98/95 | 97/94 |

[1]T1 sand drying, T3 complete drying (DIN 53 150)
[2]0 = best value (no result), 5 = worst value (coating composition film completely dissolved at the irradiated site)
[3]Before and after the QUV test

DISCUSSION OF RESULTS

The 2K-PUR clear coating compositions based on polyols A1 to A6 dried rapidly at room temperature despite the high solids content during application, and after only 1 to 2 days were already resistant to the action of super grade gasoline. High values were obtained for gloss, elasticity and film hardness, which are comparable to present-day standard systems. The coating composition formulated with comparison polyol V1, which is described in EP-A 225 809 (U.S. Pat. No. 4,855,369) and does not contain polybutadiene, had a longer drying time and a lower resistance to super grade e) 5 to 60 parts by weight of a hydroxyalkyl ester of acrylic and/or methacrylic acid having 2 to 4 carbon atoms in the hydroxyalkyl radical and primary hydroxyl groups,
    f) 0 to 50 parts by weight of a (cyclo)aliphatic ester that does not include e) of acrylic and/or methacrylic acid having 1 to 12 carbon atoms in the alcohol component,
    g) 0.1 to 20 parts by weight of an α,β-monoolefinically unsaturated monocarboxylic or dicarboxylic acid having 3 to 7 carbon atoms and/or a maleic acid or fumaric acid semi-ester having 1 to 14 carbon atoms in the alcohol radical and h) 0 to 30 parts by weight of other copolymerizable, olefinically unsaturated compounds and B) 5 to 60 parts by weight of a polyfunctional crosslinking resin, wherein the sum of components A) and B) is 100, based on the total weight of components A) and B), the sum of components a) to h) is 100, based on the total weight of components a) to h), and 1 to 30% by weight of the OH groups are secondary OH groups.

2. The binder composition of claim 1 wherein graft copolymer A) comprises a) 0.3 to 7.5 parts by weight of an optionally functional polybutadiene having a number average molecular weight of 500 to 5000 and containing at least 30% of 1,2-vinyl groups, b) 5 to 25 parts by weight of an α-olefin having 8 to 12 carbon atoms, c) 0.24 to 27 parts by weight of a glycidyl ester of an α-alkylalkanemonocarboxylic acid having 5 to 20 carbon atoms in the carboxylic acid radical, d) 15 to 65 parts by weight of styrene, e) 7.5 to 55 parts by weight of hydroxyethyl acrylate, hydroxyethyl methacrylate, 1,4-butanediol monoacrylate or mixtures thereof, f) 0 to 45 parts by weight of a (cyclo)aliphatic ester of acrylic and/or methacrylic acid having 1 to 10 carbon atoms in the alcohol component, g) 0.4 to 16.5 parts by weight of acrylic acid, methacrylic acid, a maleic acid semi-ester or a fumaric acid semi-ester having 1 to 8 carbon atoms in the alcohol component, or mixtures thereof, and h) 1 to 25 parts by weight of acrylonitrile, methacrylonitrile, hydroxypropyl(meth)acrylate, a vinyl ester of an aliphatic, optionally branched monocarboxylic acid having 1 to 10 carbon atoms in the acid radical, a di(cyclo)alkyl ester of maleic and/or fumaric acid having 1 to 8 carbon atoms in the alcohol radical, or mixtures thereof, provided that the amount of hydroxypropyl-(meth)acrylate does not exceed 10 parts by weight, wherein the sum of components a) to h) is 100 and 2 to 25% by weight of the OH groups are secondary OH groups.

3. The binder composition of claim 1 wherein graft copolymer A) comprises a) 0.5,to 5 parts by weight of an optionally functional polybutadiene having a number average molecular weight of 500 to 3000 and containing at least 40% of 1,2-vinyl groups, b) 5 to 20 parts by weight of 1-octene, 1-decene or mixtures thereof, c) 0.5 to 20 parts by weight of a glycidyl ester of an α-alkylalkanemonocarboxylic acid having 5 to 10 carbon atoms in the carboxylic acid radical, d) 20 to 65 parts by weight of styrene, e) 10 to 50 parts by weight of hydroxyethyl acrylate, hydroxyethyl methacrylate or mixtures thereof, f) 0 to 35 parts by weight of ethyl acrylate, butyl acrylate, 2-ethylhexyl acrylate, isobornyl acrylate, methyl methacrylate, ethyl methacrylate, butyl methacrylate, 2-ethylhexyl methacrylate, cyclo-hexyl methacrylate, isobornyl methacrylate or mixtures thereof, g) 0.5 to 5 parts by weight of acrylic acid, methacrylic acid or mixtures thereof and h) 3 to 20 parts by weight of a vinyl ester of an aliphatic, optionally branched monocarboxylic acid having 3 to 9 carbon atoms in the acid radical, a di(cyclo)alkyl ester of maleic and/or fumaric acid having 1 to 8 carbon atoms in the alcohol radical, and mixtures thereof, wherein the sum of components a) to h) is 100 and 3 to 20% by weight of the OH groups are secondary OH groups.

4. The binder composition of claim 1 wherein crosslinking resin B) comprises an amino resin.

5. The binder composition of claim 1 wherein crosslinking resin B) comprises an alkoxylated melamine resin, melamine-formaldehyde condensation product, urea resin, guanidine resin or mixtures thereof.

6. The binder composition of claim 1 wherein crosslinking resin B) comprises a phenolic resin, resol resin or mixtures thereof.

7. The binder composition of claim 1 wherein crosslinking resin B) comprises a polyisocyanate.

8. The binder composition of claim 2 wherein crosslinking resin B) comprises a polyisocyanate.

9. The binder composition of claim 3 wherein crosslinking resin B) comprises a polyisocyanate.

10. The binder composition of claim 1 wherein crosslinking resin B) comprises a (cyclo)aliphatic polyisocyanate having free isocyanate groups and containing biuret, allophanate, uretdione, urethane and/or isocyanurate groups.

11. The binder composition of claim 2 wherein crosslinking resin B) comprises a (cyclo)aliphatic polyisocyanate having free isocyanate groups and containing biuret, allophanate, uretdione, urethane and/or isocyanurate groups.

12. The binder composition of claim 3 wherein crosslinking resin B) comprises a (cyclo)aliphatic polyisocyanate having free isocyanate groups and containing biuret, allophanate, uretdione, urethane and/or isocyanurate groups.

13. The binder composition of claim 1 wherein crosslinking resin B) comprises a (cyclo)aliphatic polyisocyanate having blocked isocyanate groups and containing biuret, allophanate, uretdione, urethane and/or isocyanurate groups.

14. The binder composition of claim 2 wherein crosslinking resin B) comprises a (cyclo)aliphatic polyisocyanate having blocked isocyanate groups and containing biuret, allophanate, uretdione, urethane and/or isocyanurate groups.

15. The binder composition of claim 3 wherein crosslinking resin B) comprises a (cyclo)aliphatic polyisocyanate having blocked isocyanate groups and containing biuret, allophanate, uretdione, urethane and/or isocyanurate groups.

16. A substrate coated with the binder composition of claim 1.

17. A vehicle substrate coated with the binder composition of claim 1.

* * * * *